US011340836B2

(12) United States Patent
Della Monica et al.

(10) Patent No.: US 11,340,836 B2
(45) Date of Patent: May 24, 2022

(54) VIRTUAL PARTITION MANAGEMENT IN A MEMORY DEVICE

(71) Applicant: Micron Technology, Inc., Boise, ID (US)

(72) Inventors: Angelo Della Monica, Casaluce (IT); Eric Kwok Fung Yuen, Dublin, CA (US); Pasquale Cimmino, Somma Vesuviana (IT); Massimo Iaculo, San Marco Evangelista (IT); Francesco Falanga, Pozzuoli (IT)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/990,864

(22) Filed: Aug. 11, 2020

(65) Prior Publication Data
US 2020/0371719 A1 Nov. 26, 2020

Related U.S. Application Data

(62) Division of application No. 15/790,690, filed on Oct. 23, 2017, now Pat. No. 10,754,580.

(51) Int. Cl.
G06F 3/06 (2006.01)

(52) U.S. Cl.
CPC .......... G06F 3/0659 (2013.01); G06F 3/0604 (2013.01); G06F 3/0632 (2013.01); G06F 3/0644 (2013.01); G06F 3/0679 (2013.01)

(58) Field of Classification Search
CPC .... G06F 3/0604; G06F 3/0632; G06F 3/0644; G06F 3/0659; G06F 3/0679
See application file for complete search history.

(56) References Cited

U.S. PATENT DOCUMENTS 5,400,342 A  3/1995 Matsumura et al.
7,818,525 B1  10/2010 Frost et al.
(Continued)

FOREIGN PATENT DOCUMENTS

CN  1451117  10/2003
CN  104102600  10/2014
(Continued)

OTHER PUBLICATIONS

U.S. Appl. No. 15/790,690 U.S. Pat. No. 10,754,580, filed Oct. 23, 2017, Virtual Partition Management in a Memory Device.
(Continued)

Primary Examiner — Aracelis Ruiz
(74) Attorney, Agent, or Firm — Schwegman Lundberg & Woessner, P.A.

(57) ABSTRACT

A variety of applications can include apparatus and/or methods of operating the apparatus in which functionalities of a memory device of the apparatus can be extended by changing data flow behaviour associated with standard commands used between a host platform and the memory device. Such functionalities can include debug capabilities. In an embodiment, a standard write command and data using a standard protocol to write to a memory device is received in the memory device, where the data is setup information to enable an extension component in the memory device. An extension component includes instructions in the memory device to execute operations on components of the memory device. The memory device can execute operations of the enabled extension component in the memory device based on the setup information. Additional apparatus, systems, and methods are disclosed.

20 Claims, 7 Drawing Sheets

(56) References Cited

U.S. PATENT DOCUMENTS

| | | | |
|---|---|---|---|
| 8,117,406 | B2 | 2/2012 | Whang et al. |
| 8,291,295 | B2 | 10/2012 | Harari et al. |
| 8,489,907 | B2 | 7/2013 | Wakrat et al. |
| 8,572,310 | B2 | 10/2013 | Oh et al. |
| 8,745,319 | B2 | 6/2014 | Langlois et al. |
| 8,880,779 | B2 | 11/2014 | Fai et al. |
| 8,904,146 | B1 | 12/2014 | Lazar et al. |
| 8,966,319 | B2 | 2/2015 | Fai et al. |
| 9,176,864 | B2 | 11/2015 | Gorobets et al. |
| 9,342,389 | B2 | 5/2016 | Tang et al. |
| 9,389,805 | B2 | 7/2016 | Cohen et al. |
| 9,405,717 | B2 | 8/2016 | Brontvein et al. |
| 10,754,580 | B2 | 8/2020 | Della Monica et al. |
| 2008/0195801 | A1 | 8/2008 | Cheon et al. |
| 2008/0307192 | A1 | 12/2008 | Sinclair et al. |
| 2010/0312948 | A1 | 12/2010 | Yano et al. |
| 2012/0254699 | A1 | 10/2012 | Ruby et al. |
| 2012/0297122 | A1 | 11/2012 | Gorobets et al. |
| 2013/0054871 | A1 | 2/2013 | Lassa |
| 2014/0189673 | A1* | 7/2014 | Stenfort .......... G06F 9/445 717/170 |
| 2014/0254042 | A1 | 9/2014 | Yeo et al. |
| 2014/0304458 | A1 | 10/2014 | Chyan et al. |
| 2014/0317628 | A1 | 10/2014 | Kim |
| 2015/0347028 | A1 | 12/2015 | Kotte et al. |
| 2015/0347029 | A1 | 12/2015 | Kotte |
| 2016/0139812 | A1 | 5/2016 | Zhang |
| 2016/0162375 | A1 | 6/2016 | Kim |
| 2017/0024163 | A1 | 1/2017 | Zhang et al. |
| 2017/0024266 | A1 | 1/2017 | Iwai |
| 2017/0024326 | A1 | 1/2017 | Luo et al. |
| 2017/0148510 | A1 | 5/2017 | Bazarsky et al. |
| 2019/0121575 | A1 | 4/2019 | Della Monica et al. |

FOREIGN PATENT DOCUMENTS

| | | |
|---|---|---|
| CN | 109697028 A | 4/2019 |
| EP | 1486864 | 12/2004 |
| JP | 2003006137 | 1/2003 |
| WO | WO-2014209234 A1 | 12/2014 |

OTHER PUBLICATIONS

Ma, Dongzhe, et al., "LazyFTL: A Page-level Flash Translation Layer Optimized for NAND Flash Memory", SIGMOD'11, (2011), 12 pgs.

Park, Chanik, et al., "A Reconfigurable FTL (Flash Translation Layer) Architecture for NAND Flash-Based Applications", ACM Transactions on Embedded Computing Systems, vol. 7, No. 4, Article 38, (Jul. 2008), 23 pgs.

Yang, Soo-Hyeon, et al., "An Efficient Mapping Table Management in NAND Flash-Based Mobile Computers", B. Murgante et al. (Eds.): ICCSA 2011, Part III, LNCS 6784, (2011), 518-527.

"Chinese Application Serial No. 201811240329.X, Office Action dated Aug. 4, 2021", w English translation, 12 pgs.

* cited by examiner

VIRTUAL PARTITION MANAGEMENT IN A MEMORY DEVICE

PRIORITY APPLICATION

This application is a divisional of U.S. application Ser. No. 15/790,690, now U.S. Pat. No. 10,754,580, filed Oct. 23, 2017, which is incorporated herein by reference in its entirety.

BACKGROUND

Memory devices are typically provided as internal, semiconductor, integrated circuits in computers or other electronic devices. There are many different types of memory, including volatile and non-volatile memory. Volatile memory requires power to maintain its data, and examples of volatile memory include random-access memory (RAM), dynamic random-access memory (DRAM), and synchronous dynamic random-access memory (SDRAM), among others. Non-volatile memory can retain stored data when not powered, and examples of non-volatile memory include flash memory, read-only memory (ROM), electrically erasable programmable ROM (EEPROM), static RAM (SRAM), erasable programmable ROM (EPROM), resistance variable memory, such as phase-change random-access memory (PCRAM), resistive random-access memory (RRAM), magnetoresistive random-access memory (MRAM), and three-dimensional (3D) XPoint™ memory, among others.

Flash memory is utilized as non-volatile memory for a wide range of electronic applications. Flash memory devices typically include one or more groups of one-transistor, floating gate or charge trap memory cells that allow for high memory densities, high reliability, and low power consumption. Two common types of flash memory array architectures include NAND and NOR architectures, named after the logic form in which the basic memory cell configuration of each is arranged. The memory cells of the memory array are typically arranged in a matrix. In an example, the gates of each floating gate memory cell in a row of the array are coupled to an access line (e.g., a word line). In a NOR architecture, the drains of each memory cell in a column of the array are coupled to a data line (e.g., a bit line). In a NAND architecture, the memory cells in a string of the array are coupled together in series, source to drain, between a source line and a bit line.

Both NOR and NAND architecture semiconductor memory arrays are accessed through decoders that activate specific memory cells by selecting the word line coupled to their gates. In a NOR architecture semiconductor memory array, once activated, the selected memory cells place their data values on bit lines, causing different currents to flow depending on the state at which a particular cell is programmed. In a NAND architecture semiconductor memory array, a high bias voltage is applied to a drain-side select gate (SGD) line. Word lines coupled to the gates of the unselected memory cells of each group are driven at a specified pass voltage (e.g., Vpass) to operate the unselected memory cells of each group as pass transistors (e.g., to pass current in a manner that is unrestricted by their stored data values). Current then flows from the source line to the bit line through each series coupled group, restricted only by the selected memory cells of each group, placing current encoded data values of selected memory cells on the bit lines.

Each flash memory cell in a NOR or NAND architecture semiconductor memory array can be programmed individually or collectively to one or a number of programmed states. For example, a single-level cell (SLC) can represent one of two programmed states (e.g., 1 or 0), representing one bit of data. However, flash memory cells can also represent one of more than two programmed states, allowing the manufacture of higher density memories without increasing the number of memory cells, as each cell can represent more than one binary digit (e.g., more than one bit). Such cells can be referred to as multi-state memory cells, multi-digit cells, or multi-level cells (MLCs). In certain examples, MLC can refer to a memory cell that can store two bits of data per cell (e.g., one of four programmed states), a triple-level cell (TLC) can refer to a memory cell that can store three bits of data per cell (e.g., one of eight programmed states), and a quad-level cell (QLC) can store four bits of data per cell. MLC is used herein in its broader context, to can refer to any memory cell that can store more than one bit of data per cell (i.e., that can represent more than two programmed states).

Traditional memory arrays are two-dimensional (2D) structures arranged on a surface of a semiconductor substrate. To increase memory capacity for a given area, and to decrease cost, the size of the individual memory cells has decreased. However, there is a technological limit to the reduction in size of the individual memory cells, and thus, to the memory density of 2D memory arrays. In response, three-dimensional (3D) memory structures, such as 3D NAND architecture semiconductor memory devices, are being developed to further increase memory density and lower memory cost.

Such 3D NAND devices often include strings of storage cells, coupled in series (e.g., drain to source), between one or more source-side select gates (SGSs) proximate a source, and one or more drain-side select gates (SGDs) proximate a bit line. In an example, the SGSs or the SGDs can include one or more field-effect transistors (FETs) or metal-oxide semiconductor (MOS) structure devices, etc. In some examples, the strings will extend vertically, through multiple vertically spaced tiers containing respective word lines. A semiconductor structure (e.g., a polysilicon structure) may extend adjacent a string of storage cells to form a channel for the storages cells of the string. In the example of a vertical string, the polysilicon structure may be in the form of a vertically extending pillar. In some examples, the string may be "folded," and thus arranged relative to a U-shaped pillar. In other examples, multiple vertical structures may be stacked upon one another to form stacked arrays of storage cell strings.

Memory arrays or devices can be combined together to form a storage volume of a memory system, such as a solid-state drive (SSD), a Universal Flash Storage (UFS™) device, a MultiMediaCard (MMC) solid-state storage device, an embedded MMC device (eMMC™), etc. An SSD can be used as, among other things, the main storage device of a computer, having advantages over traditional hard drives with moving parts with respect to, for example, performance, size, weight, ruggedness, operating temperature range, and power consumption. For example, SSDs can have reduced seek time, latency, or other delay associated with magnetic disk drives (e.g., electromechanical, etc.). SSDs use non-volatile memory cells, such as flash memory cells to obviate internal battery supply requirements, thus allowing the drive to be more versatile and compact.

An SSD can include a number of memory devices, including a number of dies or logical units (e.g., logical unit numbers or LUNs), and can include one or more processors or other controllers performing logic functions required to operate the memory devices or interface with external systems. Such SSDs may include one or more flash memory die, including a number of memory arrays and peripheral circuitry thereon. The flash memory arrays can include a number of blocks of memory cells organized into a number of physical pages. In many examples, the SSDs will also include DRAM or SRAM (or other forms of memory die or other memory structures). The SSD can receive commands from a host in association with memory operations, such as read or write operations to transfer data (e.g., user data and associated integrity data, such as error data and address data, etc.) between the memory devices and the host, or erase operations to erase data from the memory devices.

In general, inside a memory device there can exist some features useful for failure analysis made in the manufacturer lab or production environment. These features can include debug features, special memory vendor commands, application commands, log info system features, and external input/output (I/O) peripheral features. However, these features may not be accessible from a debug test flow made on a customer host platform. For example, special memory vendor commands may require a non-standard protocol composed of particular sequences, data formatting, and dedicated acknowledge mechanism such as wait for response or ready/busy transaction. Typically, a customer host platform includes a processor operable with memory devices using sets of standard commands and protocols. Such protocols are a defined set of rules and regulations that determine how data is transmitted to and from a memory device. These protocols for a memory device can define a command set to be used with the memory device and parameters that are associated with each command of the command set. The parameters can include the manner in which control signals for the command and data to be sent with the command are to be structured in fields of data structures transmitted to the memory device. For example, a write command can include data as a field parameter to accompany the write command according to defined signals and their timing. A read command can include an address of data in the memory device as a field parameter to accompany the read command according to defined signals and their timing. Memory designs and/or operational architectures to implement increased number of memory device capabilities can enhance operation of the memory device in host platforms.

BRIEF DESCRIPTION OF THE DRAWINGS

The drawings, which are not necessarily drawn to scale, illustrate generally, by way of example, but not by way of limitation, various embodiments discussed in the present document.

DETAILED DESCRIPTION

In various embodiments, improvements of memory device capability, while configured inside a host customer platform, can be attained based on a mechanism called virtual partition that is effectively hidden to the host customer platform. Included in improvements of memory device capability can be improvements to debug capability of the memory device. Virtual partition management (VPM) can provide a feature able to extend functionalities of the memory device. VPM can be implemented to include change of the standard read/write data flow behavior of the memory device. This change can be accomplished by overriding the signal interface of the memory device for inputting and outputting data. A new device protocol may be mapped over the standard protocol using as primitives standard read and write protocol commands.

This overriding technic can be made at runtime and can open a significant number of debug opportunities, normally impossible once the memory device is configured inside the host customer platform. The new device behavior may be realized as an extended interface that is implemented by an interface extension component. In general, an extension component is an application in firmware on the memory device. A specific extension component can be associated with a new protocol. A set of extension components can include an extension component having a debug feature. Each extension component can have its own interface and defined device behavior. The interface manages input to its associated extension component according to the protocol for the specific extension component. The VPM can manage several interface extensions at runtime, that is, it can support multiple override capabilities at same time.

Electronic devices, such as mobile electronic devices (e.g., smart phones, tablets, etc.), electronic devices for use in automotive applications (e.g., automotive sensors, control units, driver-assistance systems, passenger safety or comfort systems, etc.), and internet-connected appliances or devices (e.g., internet-of-things (IoT) devices, etc.), have varying storage needs depending on, among other things, the type of electronic device, use environment, performance expectations, etc.

Electronic devices can be broken down into several main components: a processor (e.g., a central processing unit (CPU) or other main processor); memory (e.g., one or more volatile or non-volatile random-access memory (RAM) memory device, such as dynamic RAM (DRAM), mobile or low-power double-data-rate synchronous DRAM (DDR SDRAM), etc.); and a storage device (e.g., non-volatile memory (NVM) device, such as flash memory, read-only memory (ROM), an SSD, an MMC, or other memory card structure or assembly, etc.). In certain examples, electronic devices can include a user interface (e.g., a display, touch-screen, keyboard, one or more buttons, etc.), a graphics processing unit (GPU), a power management circuit, a baseband processor or one or more transceiver circuits, etc.

Figure 1:
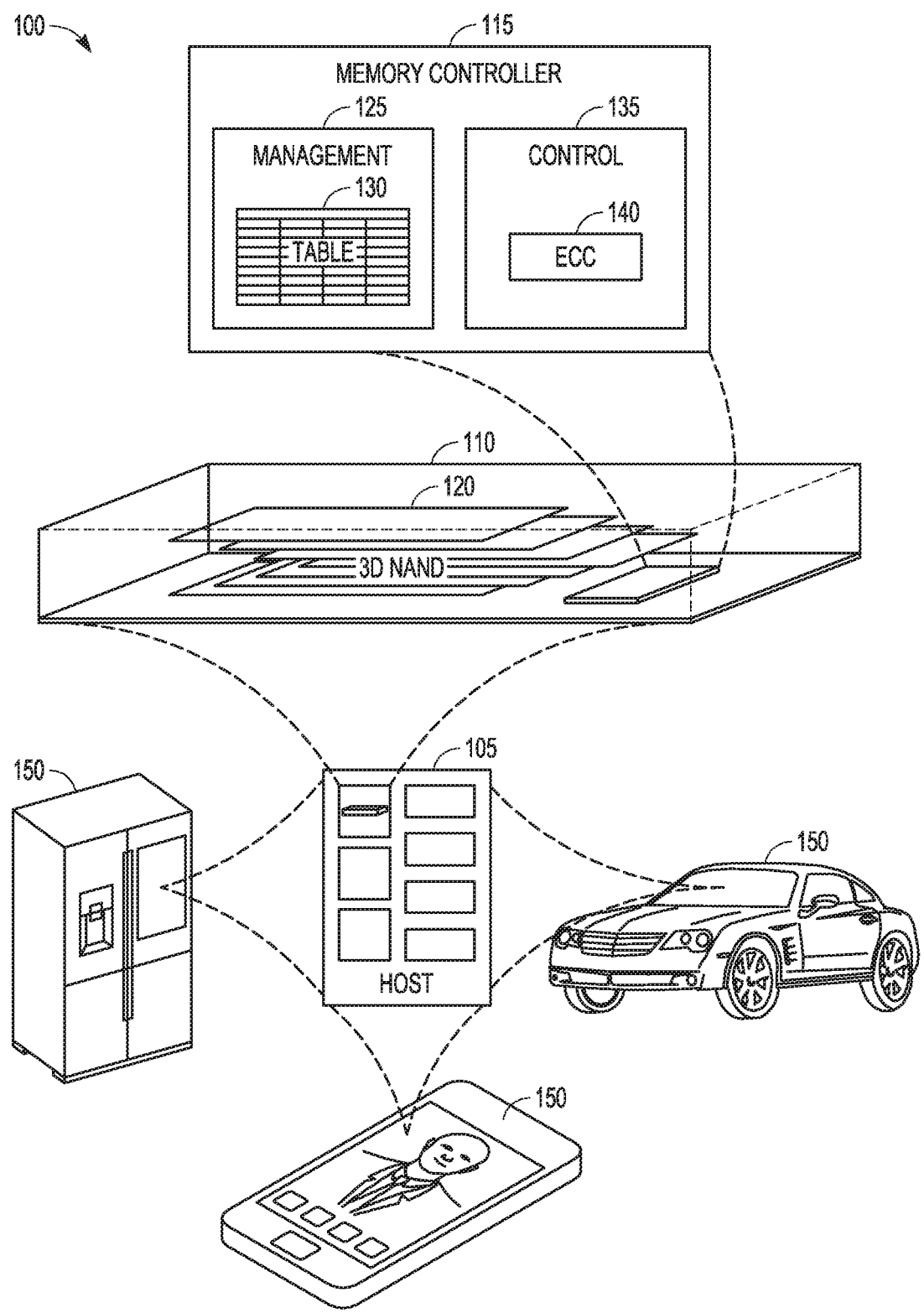
FIG. 1 illustrates an example of an environment including a memory device, according to various embodiments.

FIG. 1 illustrates an example of an environment 100 including a host device 105 and a memory device 110 configured to communicate over a communication interface. The host device 105 or the memory device 110 may be included in a variety of products 150, such as Internet of Things (IoT) devices (e.g., a refrigerator or other appliance, sensor, motor or actuator, mobile communication device, automobile, drone, etc.) to support processing, communications, or control of the product 150.

The memory device 110 includes a memory controller 115 and a memory array 120 including, for example, a number of individual memory die (e.g., a stack of three-dimensional (3D) NAND die). In 3D architecture semiconductor memory technology, vertical structures are stacked, increasing the number of tiers, physical pages, and accordingly, the density of a memory device (e.g., a storage device). In an example, the memory device 110 can be a discrete memory or storage device component of the host device 105. In other examples, the memory device 110 can be a portion of an integrated circuit (e.g., system on a chip (SOC), etc.), stacked or otherwise included with one or more other components of the host device 105.

One or more communication interfaces can be used to transfer data between the memory device 110 and one or more other components of the host device 105, such as a Serial Advanced Technology Attachment (SATA) interface, a Peripheral Component Interconnect Express (PCIe) interface, a Universal Serial Bus (USB) interface, a Universal Flash Storage (UFS) interface, an eMMC™ interface, or one or more other connectors or interfaces. The host device 105 can include a host system, an electronic device, a processor, a memory card reader, or one or more other electronic devices external to the memory device 110. In some examples, the host 105 may be a machine having some portion, or all, of the components discussed in reference to the machine 500 of FIG. 5.

The memory controller 115 can receive instructions from the host 105, and can communicate with the memory array, such as to transfer data to (e.g., write or erase) or from (e.g., read) one or more of the memory cells, planes, sub-blocks, blocks, or pages of the memory array. The memory controller 115 can include, among other things, circuitry or firmware, including one or more components or integrated circuits. For example, the memory controller 115 can include one or more memory control units, circuits, or components configured to control access across the memory array 120 and to provide a translation layer between the host 105 and the memory device 110. The memory controller 115 can include one or more input/output (I/O) circuits, lines, or interfaces to transfer data to or from the memory array 120. The memory controller 115 can include a memory manager 125 and an array controller 135.

The memory manager 125 can include, among other things, circuitry or firmware, such as a number of components or integrated circuits associated with various memory management functions. For purposes of the present description example memory operation and management functions will be described in the context of NAND memory. Persons skilled in the art will recognize that other forms of non-volatile memory may have analogous memory operations or management functions. Such NAND management functions include wear leveling (e.g., garbage collection or reclamation), error detection or correction, block retirement, or one or more other memory management functions. The memory manager 125 can parse or format host commands (e.g., commands received from a host) into device commands (e.g., commands associated with operation of a memory array, etc.), or generate device commands (e.g., to accomplish various memory management functions) for the array controller 135 or one or more other components of the memory device 110.

The memory manager 125 can include a set of management tables 130 configured to maintain various information associated with one or more component of the memory device 110 (e.g., various information associated with a memory array or one or more memory cells coupled to the memory controller 115). For example, the management tables 130 can include information regarding block age, block erase count, error history, or one or more error counts (e.g., a write operation error count, a read bit error count, a read operation error count, an erase error count, etc.) for one or more blocks of memory cells coupled to the memory controller 115. In certain examples, if the number of detected errors for one or more of the error counts is above a threshold, the bit error can be referred to as an uncorrectable bit error. The management tables 130 can maintain a count of correctable or uncorrectable bit errors, among other things.

The array controller 135 can include, among other things, circuitry or components configured to control memory operations associated with writing data to, reading data from, or erasing one or more memory cells of the memory device 110 coupled to the memory controller 115. The memory operations can be based on, for example, host commands received from the host 105, or internally generated by the memory manager 125 (e.g., in association with wear leveling, error detection or correction, etc.).

The array controller 135 can include an error correction code (ECC) component 140, which can include, among other things, an ECC engine or other circuitry configured to detect or correct errors associated with writing data to or reading data from one or more memory cells of the memory device 110 coupled to the memory controller 115. The memory controller 115 can be configured to actively detect and recover from error occurrences (e.g., bit errors, operation errors, etc.) associated with various operations or storage of data, while maintaining integrity of the data transferred between the host 105 and the memory device 110, or maintaining integrity of stored data (e.g., using redundant RAID storage, etc.), and can remove (e.g., retire) failing memory resources (e.g., memory cells, memory arrays, pages, blocks, etc.) to prevent future errors.

The memory array 120 can include several memory cells arranged in, for example, a number of devices, planes, sub-blocks, blocks, or pages. As one example, a 48 GB TLC NAND memory device can include 18,592 bytes (B) of data per page (16,384+2208 bytes), 1536 pages per block, 548 blocks per plane, and 4 or more planes per device. As another example, a 32 GB MLC memory device (storing two bits of data per cell (i.e., 4 programmable states)) can include 18,592 bytes (B) of data per page (16,384+2208 bytes), 1024 pages per block, 548 blocks per plane, and 4 planes per device, but with half the required write time and twice the program/erase (P/E) cycles as a corresponding TLC memory device. Other examples can include other numbers or arrangements. In some examples, a memory device, or a portion thereof, may be selectively operated in SLC mode, or in a desired MLC mode (such as TLC, QLC, etc.).

In operation, data is typically written to or read from the NAND memory device 110 in pages, and erased in blocks. However, one or more memory operations (e.g., read, write, erase, etc.) can be performed on larger or smaller groups of memory cells, as desired. The data transfer size of a NAND memory device 110 is typically referred to as a page, whereas the data transfer size of a host is typically referred to as a sector.

Although a page of data can include a number of bytes of user data (e.g., a data payload including a number of sectors of data) and its corresponding metadata, the size of the page often refers only to the number of bytes used to store the user data. As an example, a page of data having a page size of 4 KB may include 4 KB of user data (e.g., 8 sectors assuming a sector size of 512 B) as well as a number of bytes (e.g., 32 B, 54 B, 224 B, etc.) of metadata corresponding to the user data, such as integrity data (e.g., error detecting or correcting code data), address data (e.g., logical address data, etc.), or other metadata associated with the user data.

Different types of memory cells or memory arrays 120 can provide for different page sizes, or may require different amounts of metadata associated therewith. For example, different memory device types may have different bit error rates, which can lead to different amounts of metadata necessary to ensure integrity of the page of data (e.g., a memory device with a higher bit error rate may require more bytes of error correction code data than a memory device with a lower bit error rate). As an example, a multi-level cell (MLC) NAND flash device may have a higher bit error rate than a corresponding single-level cell (SLC) NAND flash device. As such, the MLC device may require more metadata bytes for error data than the corresponding SLC device.

Figure 2:
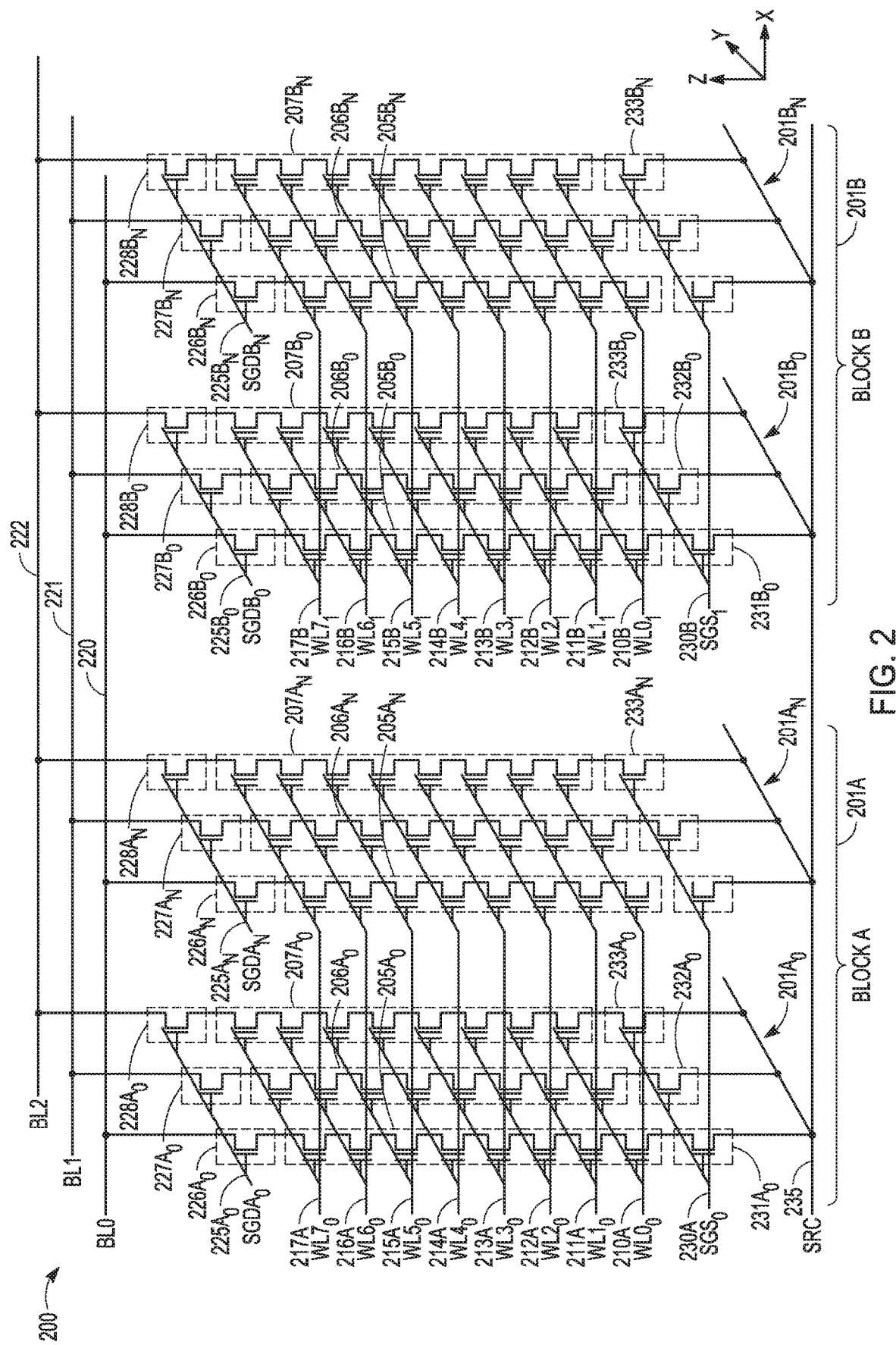
FIGS. 2 and 3 illustrate schematic diagrams of an example of a three-dimensional NAND architecture semiconductor memory array, according to various embodiments.

FIG. 2 illustrates an example schematic diagram of a 3D NAND architecture semiconductor memory array 200 including a number of strings of memory cells (e.g., first-third $A_0$ memory strings $205A_0$-$207A_0$, first-third $A_n$ memory strings $205A_n$-$207A_n$, first-third $B_0$ memory strings $205B_0$-$207B_0$, first-third $B_n$ memory strings $205B_n$-$207B_n$, etc.), organized in blocks (e.g., block A 201A, block B 201B, etc.) and sub-blocks (e.g., sub-block $A_0$ $201A_0$, sub-block $A_n$ $201A_n$, sub-block $B_0$ $201B_0$, sub-block $B_n$ $201B_n$, etc.). The memory array 200 represents a portion of a greater number of similar structures that would typically be found in a block, device, or other unit of a memory device.

Each string of memory cells includes a number of tiers of charge storage transistors (e.g., floating gate transistors, charge-trapping structures, etc.) stacked in the Z direction, source to drain, between a source line (SRC) 235 or a source-side select gate (SGS) (e.g., first-third $A_0$ SGS $231A_0$-$233A_0$, first-third $A_n$ SGS $231A_n$-$233A_n$, first-third $B_0$ SGS $231B_0$-$233B_0$, first-third $B_n$ SGS $231B_n$-$233B_n$, etc.) and a drain-side select gate (SGD) (e.g., first-third $A_0$ SGD $226A_0$-$228A_0$, first-third $A_n$ SGD $226A_n$-$228A_n$, first-third $B_0$ SGD $226B_0$-$228B_0$, first-third $B_n$ SGD $226B_n$-$228B_n$, etc.). Each string of memory cells in the 3D memory array can be arranged along the X direction as data lines (e.g., bit lines (BL) BL0-BL2 220-222), and along the Y direction as physical pages.

Within a physical page, each tier represents a row of memory cells, and each string of memory cells represents a column. A sub-block can include one or more physical pages. A block can include a number of sub-blocks (or physical pages) (e.g., 128, 256, 384, etc.). Although illustrated herein as having two blocks, each block having two sub-blocks, each sub-block having a single physical page, each physical page having three strings of memory cells, and each string having 8 tiers of memory cells, in other examples, the memory array 200 can include more or fewer blocks, sub-blocks, physical pages, strings of memory cells, memory cells, or tiers. For example, each string of memory cells can include more or fewer tiers (e.g., 16, 32, 64, 128, etc.), as well as one or more additional tiers of semiconductor material above or below the charge storage transistors (e.g., select gates, data lines, etc.), as desired. As an example, a 48 GB TLC NAND memory device can include 18,592 bytes (B) of data per page (16,384+2208 bytes), 1536 pages per block, 548 blocks per plane, and 4 or more planes per device.

Each memory cell in the memory array 200 includes a control gate (CG) coupled to (e.g., electrically or otherwise operatively connected to) an access line (e.g., word lines (WL) $WL0_0$-$WL7_0$ 210A-217A, $WL0_1$-$WL7_1$210B-217B, etc.), which collectively couples the control gates (CGs) across a specific tier, or a portion of a tier, as desired. Specific tiers in the 3D memory array, and accordingly, specific memory cells in a string, can be accessed or controlled using respective access lines. Groups of select gates can be accessed using various select lines. For example, first-third $A_0$ SGD $226A_0$-$228A_0$ can be accessed using an $A_0$ SGD line $SGDA_0$ $225A_0$, first-third $A_n$ SGD $226A_n$-$228A_n$ can be accessed using an $A_n$ SGD line $SGDA_n$ $225A_n$, first-third $B_0$ SGD $226B_0$-$228B_0$ can be accessed using an $B_0$ SGD line $SGDB_0$ $225B_0$, and first-third $B_n$ SGD $226B_n$-$228B_n$ can be accessed using an $B_n$ SGD line $SGDB_n$ $225B_n$. First-third $A_0$ SGS $231A_0$-$233A_0$ and first-third $A_n$ SGS $231A_n$-$233A_n$ can be accessed using a gate select line $SGS_0$ 230A, and first-third $B_0$ SGS $231B_0$-$233B_0$ and first-third B SGS 231B-233B can be accessed using a gate select line $SGS_1$ 230B.

In an example, the memory array 200 can include a number of levels of semiconductor material (e.g., polysilicon, etc.) configured to couple the control gates (CGs) of each memory cell or select gate (or a portion of the CGs or select gates) of a respective tier of the array. Specific strings of memory cells in the array can be accessed, selected, or controlled using a combination of bit lines (BLs) and select gates, etc., and specific memory cells at one or more tiers in the specific strings can be accessed, selected, or controlled using one or more access lines (e.g., word lines).

Figure 3:
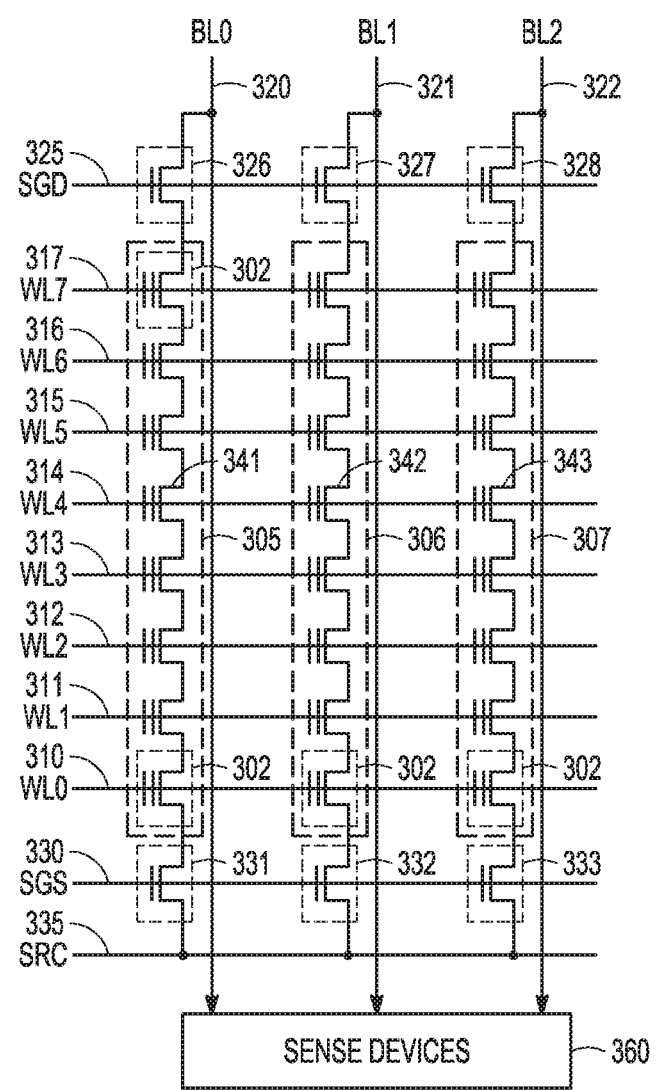

FIG. 3 illustrates an example schematic diagram of a portion of a NAND architecture semiconductor memory array 300 including a plurality of memory cells 302 arranged in a two-dimensional array of strings (e.g., first-third strings 305-307) and tiers (e.g., illustrated as respective word lines (WL) WL0-WL7 310-317, a drain-side select gate (SGD) line 325, a source-side select gate (SGS) line 330, etc.), and sense amplifiers or devices 360. For example, the memory array 300 can illustrate an example schematic diagram of a portion of one physical page of memory cells of a 3D NAND architecture semiconductor memory device, such as illustrated in FIG. 2.

Each string of memory cells is coupled to a source line (SRC) using a respective source-side select gate (SGS) (e.g., first-third SGS 331-333), and to a respective data line (e.g., first-third bit lines (BL) BL0-BL2 320-322) using a respective drain-side select gate (SGD) (e.g., first-third SGD 326-328). Although illustrated with 8 tiers (e.g., using word lines (WL) WL0-WL7 310-317) and three data lines (BL0-BL2 326-328) in the example of FIG. 3, other examples can include strings of memory cells having more or fewer tiers or data lines, as desired.

In a NAND architecture semiconductor memory array, such as the example memory array 300, the state of a selected memory cell 302 can be accessed by sensing a current or voltage variation associated with a particular data line containing the selected memory cell. The memory array 300 can be accessed (e.g., by a control circuit, one or more processors, digital logic, etc.) using one or more drivers. In an example, one or more drivers can activate a specific memory cell, or set of memory cells, by driving a particular potential to one or more data lines (e.g., bit lines BL0-BL2), access lines (e.g., word lines WL0-WL7), or select gates, depending on the type of operation desired to be performed on the specific memory cell or set of memory cells.

To program or write data to a memory cell, a programming voltage (Vpgm) (e.g., one or more programming pulses, etc.) can be applied to selected word lines (e.g., WL4), and thus, to a control gate of each memory cell coupled to the selected word lines (e.g., first-third control gates (CGs) 341-343 of the memory cells coupled to WL4). Programming pulses can begin, for example, at or near 15V, and, in certain examples, can increase in magnitude during each programming pulse application. While the program voltage is applied to the selected word lines, a potential, such as a ground potential (e.g., Vss), can be applied to the data lines (e.g., bit lines) and substrates (and thus the channels, between the sources and drains) of the memory cells targeted for programming, resulting in a charge transfer (e.g., direct injection or Fowler-Nordheim (FN) tunneling, etc.) from the channels to the floating gates of the targeted memory cells.

In contrast, a pass voltage (Vpass) can be applied to one or more word lines having memory cells that are not targeted for programming, or an inhibit voltage (e.g., Vcc) can be applied to data lines (e.g., bit lines) having memory cells that are not targeted for programming, for example, to inhibit charge from being transferred from the channels to the floating gates of such non-targeted memory cells. The pass voltage can be variable, depending, for example, on the proximity of the applied pass voltages to a word line targeted for programming. The inhibit voltage can include a supply voltage (Vcc), such as a voltage from an external source or supply (e.g., a battery, an AC-to-DC converter, etc.), relative to a ground potential (e.g., Vss).

As an example, if a programming voltage (e.g., 15V or more) is applied to a specific word line, such as WL4, a pass voltage of 10V can be applied to one or more other word lines, such as WL3, WL5, etc., to inhibit programming of non-targeted memory cells, or to retain the values stored on such memory cells not targeted for programming. As the distance between an applied program voltage and the non-targeted memory cells increases, the pass voltage required to refrain from programming the non-targeted memory cells can decrease. For example, where a programming voltage of 15V is applied to WL4, a pass voltage of 10V can be applied to WL3 and WL5, a pass voltage of 8V can be applied to WL2 and WL6, a pass voltage of 7V can be applied to WL1 and WL7, etc. In other examples, the pass voltages, or number of word lines, etc., can be higher or lower, or more or less.

The sense amplifiers 360, coupled to one or more of the data lines (e.g., first, second, or third bit lines (BL0-BL2) 320-322), can detect the state of each memory cell in respective data lines by sensing a voltage or current on a particular data line.

Between applications of one or more programming pulses (e.g., Vpgm), a verify operation can be performed to determine if a selected memory cell has reached its intended programmed state. If the selected memory cell has reached its intended programmed state, it can be inhibited from further programming. If the selected memory cell has not reached its intended programmed state, additional programming pulses can be applied. If the selected memory cell has not reached its intended programmed state after a particular number of programming pulses (e.g., a maximum number), the selected memory cell, or a string, block, or page associated with such memory cell, can be marked as defective.

To erase a memory cell or a group of memory cells (e.g., erasure is typically performed in blocks or sub-blocks), an erasure voltage (Vers) (e.g., typically Vpgm) can be applied to the substrates (and thus the channels, between the sources and drains) of the memory cells targeted for erasure (e.g., using one or more bit lines, select gates, etc.), while the word lines of the targeted memory cells are kept at a potential, such as a ground potential (e.g., Vss), resulting in a charge transfer (e.g., direct injection or Fowler-Nordheim (FN) tunneling, etc.) from the floating gates of the targeted memory cells to the channels.

Figure 4:
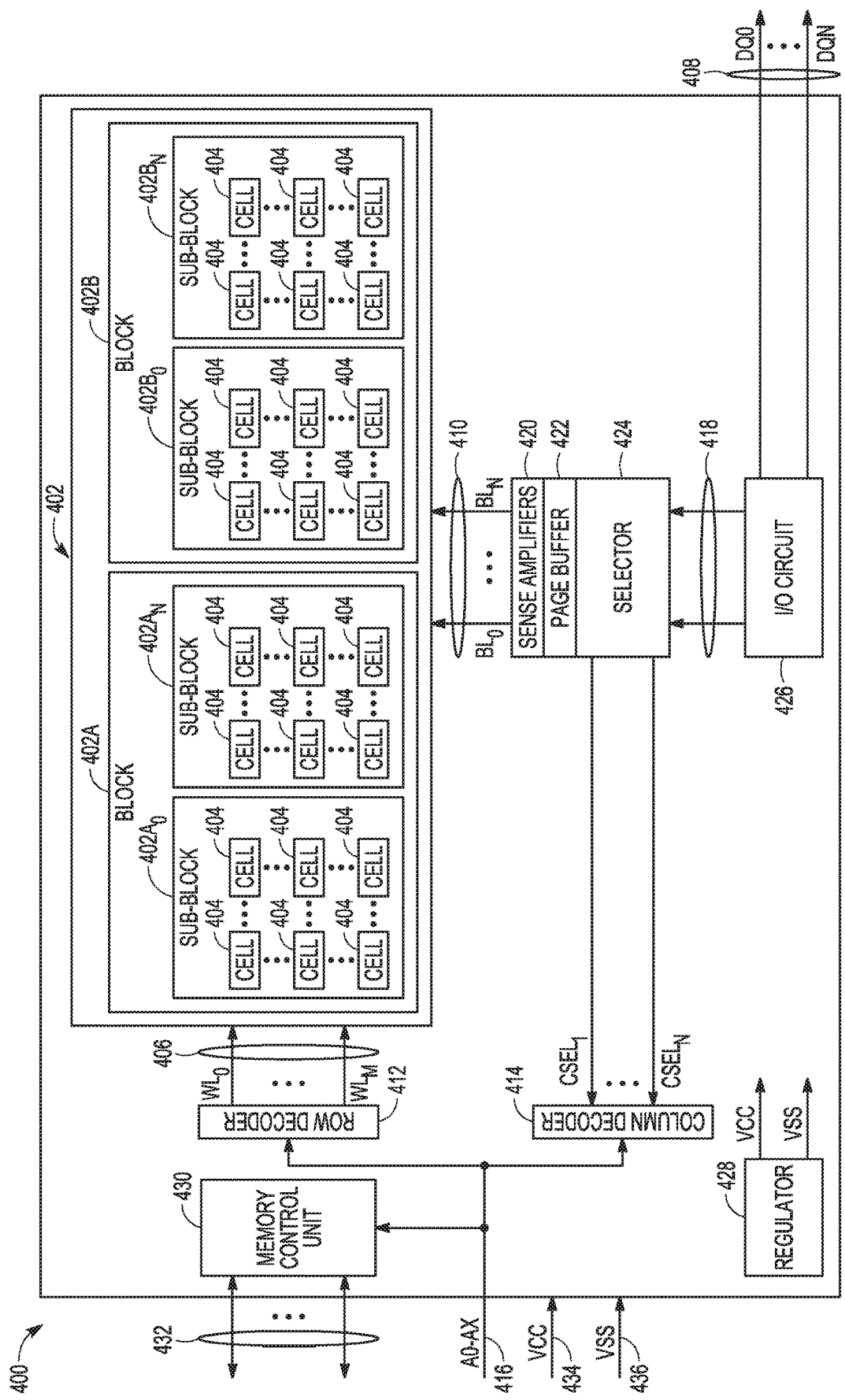
FIG. 4 illustrates an example block diagram of a memory module, according to various embodiments.

FIG. 4 illustrates an example block diagram of a memory device 400 including a memory array 402 having a plurality of memory cells 404, and one or more circuits or components to provide communication with, or perform one or more memory operations on, the memory array 402. The memory device 400 can include a row decoder 412, a column decoder 414, sense amplifiers 420, a page buffer 422, a selector 424, an input/output (I/O) circuit 426, and a memory control unit 430.

The memory cells 404 of the memory array 402 can be arranged in blocks, such as first and second blocks 402A, 402B. Each block can include sub-blocks. For example, the first block 402A can include first and second sub-blocks $402A_0$, $402A_n$, and the second block 402B can include first and second sub-blocks $402B_0$, $402B_n$. Each sub-block can include a number of physical pages, each page including a number of memory cells 404. Although illustrated herein as having two blocks, each block having two sub-blocks, and each sub-block having a number of memory cells 404, in other examples, the memory array 402 can include more or fewer blocks, sub-blocks, memory cells, etc. In other examples, the memory cells 404 can be arranged in a number of rows, columns, pages, sub-blocks, blocks, etc., and accessed using, for example, access lines 406, first data lines 410, or one or more select gates, source lines, etc.

The memory control unit 430 can control memory operations of the memory device 400 according to one or more signals or instructions received on control lines 432, including, for example, one or more clock signals or control signals that indicate a desired operation (e.g., write, read, erase, etc.), or address signals (A0-AX) received on one or more address lines 416. One or more devices external to the memory device 400 can control the values of the control signals on the control lines 432, or the address signals on the address line 416. Examples of devices external to the memory device 400 can include, but are not limited to, a host, a memory controller, a processor, or one or more circuits or components not illustrated in FIG. 4.

The memory device 400 can use access lines 406 and first data lines 410 to transfer data to (e.g., write or erase) or from (e.g., read) one or more of the memory cells 404. The row decoder 412 and the column decoder 414 can receive and decode the address signals (A0-AX) from the address line 416, can determine which of the memory cells 404 are to be accessed, and can provide signals to one or more of the access lines 406 (e.g., one or more of a plurality of word lines (WL0-WLm)) or the first data lines 410 (e.g., one or more of a plurality of bit lines (BL0-BLn)), such as described above.

The memory device 400 can include sense circuitry, such as the sense amplifiers 420, configured to determine the values of data on (e.g., read), or to determine the values of data to be written to, the memory cells 404 using the first data lines 410. For example, in a selected string of memory cells 404, one or more of the sense amplifiers 420 can read a logic level in the selected memory cell 404 in response to a read current flowing in the memory array 402 through the selected string to the data lines 410.

One or more devices external to the memory device 400 can communicate with the memory device 400 using the I/O lines (DQ0-DQN) 408, address lines 416 (A0-AX), or control lines 432. The input/output (I/O) circuit 426 can transfer values of data in or out of the memory device 400, such as in or out of the page buffer 422 or the memory array 402, using the I/O lines 408, according to, for example, the control lines 432 and address lines 416. The page buffer 422 can store data received from the one or more devices external to the memory device 400 before the data is programmed into relevant portions of the memory array 402, or can store data read from the memory array 402 before the data is transmitted to the one or more devices external to the memory device 400.

The column decoder 414 can receive and decode address signals (A0-AX) into one or more column select signals (CSEL1-CSELn). The selector 424 (e.g., a select circuit) can receive the column select signals (CSEL1-CSELn) and select data in the page buffer 422 representing values of data to be read from or to be programmed into memory cells 404. Selected data can be transferred between the page buffer 422 and the I/O circuit 426 using second data lines 418.

The memory control unit 430 can receive positive and negative supply signals, such as a supply voltage (Vcc) 434 and a negative supply (Vss) 436 (e.g., a ground potential), from an external source or supply (e.g., an internal or external battery, an AC-to-DC converter, etc.). In certain examples, the memory control unit 430 can include a regulator 428 to internally provide positive or negative supply signals.

Figure 5:
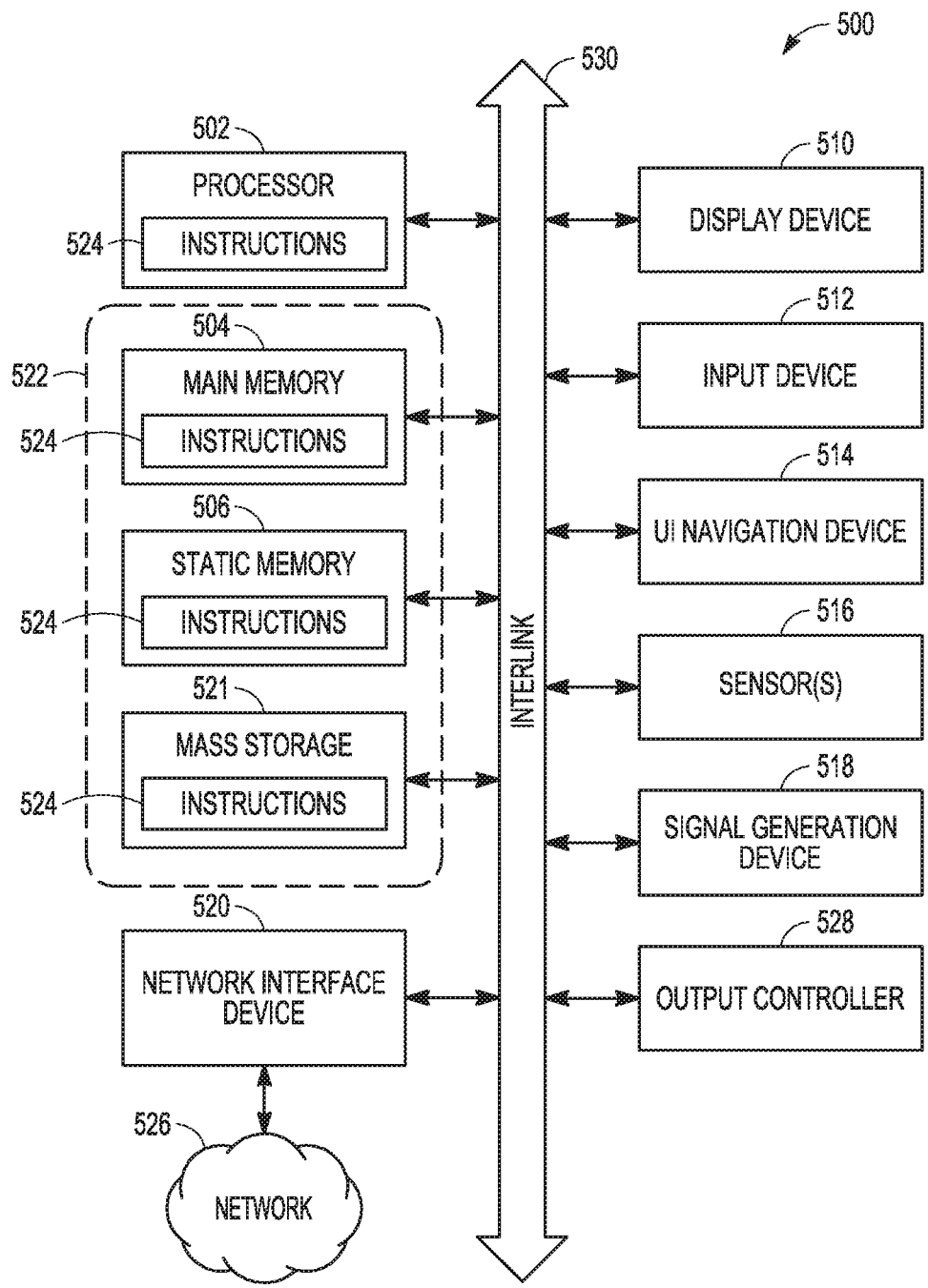
FIG. 5 is a block diagram illustrating an example of a machine upon which one or more embodiments may be implemented, according to various embodiments.

FIG. 5 illustrates a block diagram of an example machine 500 upon which any one or more of the techniques (e.g., methodologies) discussed herein may perform. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, an IoT device, automotive system, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic, components, devices, packages, or mechanisms. Circuitry is a collection (e.g., set) of circuits implemented in tangible entities that include hardware (e.g., simple circuits, gates, logic, etc.). Circuitry membership may be flexible over time and underlying hardware variability. Circuitries include members that may, alone or in combination, perform specific tasks when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

The machine (e.g., computer system) 500 (e.g., the host device 105, the memory device 110, etc.) may include a hardware processor 502 (e.g., a central processing unit (CPU), a graphics processing unit (GPU), a hardware processor core, or any combination thereof, such as the memory controller 115, etc.), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a storage device (e.g., drive unit) 521, a signal generation device 518 (e.g., a speaker), a network interface device 520, and one or more sensors 516, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 521 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 521 may constitute the machine readable medium 522.

While the machine readable medium 522 is illustrated as a single medium, the term "machine readable medium" may include a single medium or multiple media (e.g., a centralized or distributed database, or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine-readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 (e.g., software, programs, an operating system (OS), etc.) or other data are stored on the storage device 521, can be accessed by the memory 504 for use by the processor 502. The memory 504 (e.g., DRAM) is typically fast, but volatile, and thus a different type of storage than the storage device 521 (e.g., an SSD), which is suitable for long-term storage, including while in an "off" condition. The instructions 524 or data in use by a user or the machine 500 are typically loaded in the memory 504 for use by the processor 502. When the memory 504 is full, virtual space from the storage device 521 can be allocated to supplement the memory 504; however, because the storage 521 device is typically slower than the memory 504, and write speeds are typically at least twice as slow as read speeds, use of virtual memory can greatly reduce user experience due to storage device latency (in contrast to the memory 504, e.g., DRAM). Further, use of the storage device 521 for virtual memory can greatly reduce the usable lifespan of the storage device 521.

In contrast to virtual memory, virtual memory compression (e.g., the Linux® kernel feature "ZRAM") uses part of the memory as compressed block storage to avoid paging to the storage device 521. Paging takes place in the compressed block until it is necessary to write such data to the storage device 521. Virtual memory compression increases the usable size of memory 504, while reducing wear on the storage device 521.

Storage devices optimized for mobile electronic devices, or mobile storage, traditionally include MMC solid-state storage devices (e.g., micro Secure Digital (microSD™) cards, etc.). MMC devices include a number of parallel interfaces (e.g., an 8-bit parallel interface) with a host device, and are often removable and separate components from the host device. In contrast, eMMC™ devices are attached to a circuit board and considered a component of the host device, with read speeds that rival serial ATA™ (Serial AT (Advanced Technology) Attachment, or SATA) based SSD devices. However, demand for mobile device performance continues to increase, such as to fully enable virtual or augmented-reality devices, utilize increasing networks speeds, etc. In response to this demand, storage devices have shifted from parallel to serial communication interfaces. Universal Flash Storage (UFS) devices, including controllers and firmware, communicate with a host device using a low-voltage differential signaling (LVDS) serial interface with dedicated read/write paths, further advancing greater read/write speeds.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

Figure 6:
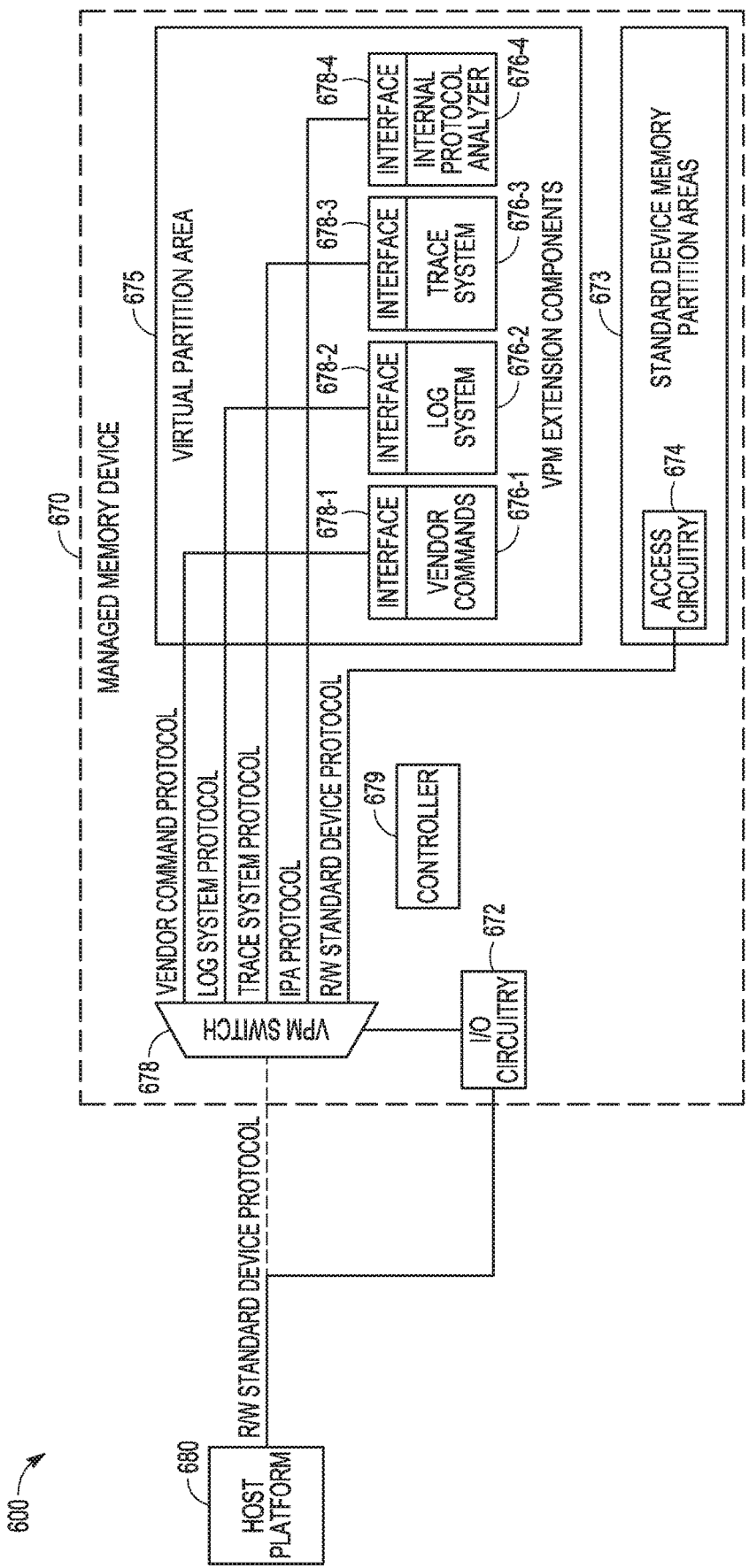
FIG. 6 is a block diagram of an example system having a host platform coupled to a managed memory device, according to various embodiments.

FIG. 6 is a block diagram of an embodiment of features of an example system 600 having a host platform 680 coupled to a managed memory device 670. Managed memory device 670 can include standard device memory partitioned areas 673 for the type of memory device to which managed memory device 670 corresponds, which can store data and retrieve data from and for host platform 680 via I/O circuitry 672. Memory cells in standard device memory partitioned areas 673 can be addressed using access circuitry 674. Managed memory device 670 can be, but is not limited to, a NAND memory device. Though FIG. 6 shows host platform 680 coupled to one managed memory device 670, host platform 680 may be coupled to more than one managed memory device 670 and other memory devices.

Managed memory device 670 includes a VPM having a virtual partition area 675 and a VPM switch 678. Virtual partition area 675 can include a number of VPM extension components. For example, virtual partition area 675 can include an extension component 676-1 for vendor commands with an interface 677-1 operable with respect to a vendor command protocol; extension component 676-2 for a log system with an interface 677-2 operable with respect to a log system protocol; an extension component 676-3 for a trace system with an interface 677-3 operable with respect to a trace system protocol; and extension component 676-4 for an internal protocol analyzer (IPA) with an interface 677-4 operable with respect to an IPA protocol. Among other things, the VPM can simplify access to device debug capability of managed memory device 670 using a non-invasive mechanism that is effectively transparent for the host platform. For example, a debug test flow can use the standard data command transactions between host platform 680 and managed memory device 670 to invoke a specific device function of managed memory device 670 without a risk of hanging or freezing host platform 680 with unmanaged special vendor commands.

Host platform 680 can operate with managed memory device 670 in a standard manner for a host and a memory device 670. Host platform 680 can send commands to managed memory device 670 to read from and write to managed memory device 670 using read and write protocols that are standard for these two identities. Writing to managed memory device 670 can include generating a write command, control signals and data according to a particular format that can define a standard write protocol. Managed memory device 670 can include a number of input nodes to receive such signals from host platform and a number of output nodes to return appropriate signals. At host platform, data loaded for transmission to managed memory device 670 is user controlled, such as an application, where the data itself is not part of the details of the write protocol. To focus on elements of embodiments discussed herein, these nodes and associated signals are included I/O circuitry 672, where at least a portion can be controlled by a controller 679. Controller 679 can execute operations of circuits and firmware within managed memory device 670.

The dotted line between host platform 680 and VPM switch 678 indicates that commands and parameters in accordance with their standard protocols are directed to I/O circuitry 672 of managed memory device 670, but can be managed via VPM switch 678. I/O circuitry 672 provides hardware to store command argument, which includes parameters of the protocol for the command, and to raise an event to the VPM firmware, which in turn accesses a command index and the specific argument in the firmware, such as in tables, and can make a determination to activate the VPM to execute the VPM switch 678.

The VPM and VPM switch 678 can be enabled and disabled statically or at runtime using any standard command dedicated for memory device configuration command, also referred to as a memory device setting command. For example, an embedded multi-media controller (eMMC) command can be used for enabling and/or disabling VPM switch 678, by setting some device reserved fields. An eMMC command is part of a JEDEC standard. As with data associated with a write command, information can be input to data fields that are not protocol dependent with respect to the information itself.

During VPM and VPM switch 678 enabling, extension components and their respective interfaces can be chosen for loading. There are a number of possible extension components that can be selected. Extension component 676-1 for vendor commands with an interface 677-1 can provide a vendor commands manager to manage execution of a set of complex memory device vendor commands. Extension component 676-2 for a log system with an interface 677-2 can provide a system log reader to get information log directly from managed memory device 670. Extension component 676-3 for a trace system with an interface 677-3 can provide a trace system used for starting, acquiring and reading of trace points. Extension component 676-4 for IPA with an interface 677-4 can provide an internal protocol analyzer extension component to capture and analyze signals and data flow in the memory device and output results of the capture and analysis. The IPA can be structured as a silent component that, in addition to internal signals, also can capture all transactions on a standard memory interface such as a standard memory interface to access standard device memory partitioned areas 673. For example, the IPA can capture all eMMC standard commands, all UFS standard commands, and/or standard commands of other machine-readable storage devices. Component 676-4 for IPA can operate as another filter extension, where managed memory device 670 acquires by its actions all protocol transactions and return it through the VPM mechanism to host platform 680 for platform reverse engineering. In addition, a set of extension components can include an extension component for a set of application commands not correctly managed by some host platforms.

Each extension component can implement its own Interface over the device standard protocol between host platform 680 and managed memory device 670, which can be implemented by VPM switch 678. A debug test flow can use one or more of these interfaces in order to perform any test activities directly on the host platform. This can be accomplished with data for debug loaded as data payload of a write command and VPM switch 678 can direct the data for debug to the appropriate extension component for operation of the extension component with results for debug analysis returned to host platform 680, via a read command with a request for the results loaded for example in address fields.

A classification of extension interface components can include a protocol extension component, a log extension component, and a filter extension component. The protocol extension component is associated with remapping vendor commands or special commands over standard protocol interface. The log extension component is associated with a system information log reader and trace system. With respect to a filter extension component, the VPM can work also in silent mode, apparently without overcoming standard device protocol, that is, the VPM can be kept enabled without affecting standard write/read commands, where it allows issue of normal operations by the host. For example, when the parameters of the protocol for a received read or write command include data/information for a standard read or write operation of standard device memory partitioned areas 673, VPM switch 678 can direct the data/information to access circuitry 674 in conjunction with I/O circuitry 672 and controller 679.

In addition, managed memory device 670 can filter some commands and associate a determinate behavior in order to simulate injection error. Some normal commands can be used as a vehicle to examine error cases. This can be useful, for example, when a host platform behavior is under investigation in case of error by the memory device. Since errors are normally unpredictable, the VPM can be used to detect specific host command/arguments and to make an error happen from the memory device side during that command execution. The host behavior can be analyzed in depth and the relevant firmware design can be improved for the particular cases under investigation.

The above partition extension components, and other extension components, do not require any platform adaption/modification/setting such as a device driver modification, operating system (OS) kernel mode setting, or super user owner designation. VPM interaction can be enabled on the standard protocol in a number of modes. With respect to enabling, any standard device configuration command can be sent to managed memory device 670. In various embodiments, a standard EMMC CMD6 command using some reserved fields can be issued. Through this command from use of the reserved fields, selection of an extension component can be loaded for execution.

For set/write, the VPM extension can support any special set or write command over the standard device data write transaction. For example, vendor commands can be issued using the standard write multiple command CMD25, where the data block transferred using the standard command contains all vendor command parameters.

For get/read, the VPM extension can support any special get or read command over the standard device data read transaction. For example, several information logs of the managed memory device, dealing with different logical block addressing (LBA) for each log type, can be read.

In an embodiment of an example process flow, a command can be sent to initialize the VPM. The VPM switch can be activated, from reception of the command, to switch to an extension component. Once switched, the subsequent standard commands received can contain information/parameters for the selected extension component. Consider the following example flow, the host sends a configuration command to enable a particular VPM extension component in the memory device. The memory device switches in VPM and loads the particular VPM extension component. For example, the particular VPM extension component can be a vendor command extension component. The host can send a standard write+data command to setup a particular vendor command. For example, the vendor command may be a direct read raw data from the memory device, which can be a NAND memory device. The host sends a standard read command, and in response to the read command, the memory device provides raw data from the NAND.

Use of standard write/read command provides a mechanism to encapsulate and transport requests and responses between host and device. For example, a setup command can be mapped on a standard write operation. Generally, in a standard write operation, the host sends CMD(Write)+1 DATA block, which contains standard host user data to be written into the internal memory array of the memory device. The memory device writes DATA to internal memory array and effectively answers okay back to the host with respect to successful completion of the write operation. For a setup operation, as taught herein, the host can send CMD(Write)+1 DATA block, where the DATA block does not contain user data to be written into the internal memory array of the memory device, but instead contains, the setup information (though at the host the setup information is loaded as data into the data structure to be sent according to the write protocol). The memory device interprets, via a VPM switch such as VPM switch 678, the received command and data, and uses the setup information, sent as DATA, to perform some internal setup operations. Then, the memory device effectively answers okay back to the host when it has successfully finished the setup operations.

Standard host read commands can be issued by the host to read results from operating an extension component. After a VPM switch, such as VPM switch 678, is enabled, a standard write command can be used by the host to convey, to the memory device, a protocol specific request, and a standard read command can be used to convey the results/response/information to the specific request back to the host. Such mechanism can also be used, for example, to convey out, to the host, information related to internal hardware status, firmware status, and data structure, for example for debug purposes.

Examples of standard commands that can be used include CMD6 and CMD25, which are eMMC Jedec standard commands. CMD6 is usually used as a device setting command and consists of a 32 bits argument which indicates the setup itself to be performed. CMD25 is a write command with 32 bits argument to indicate the memory device address to write and is followed by 512 bytes of block data.

Figure 7:
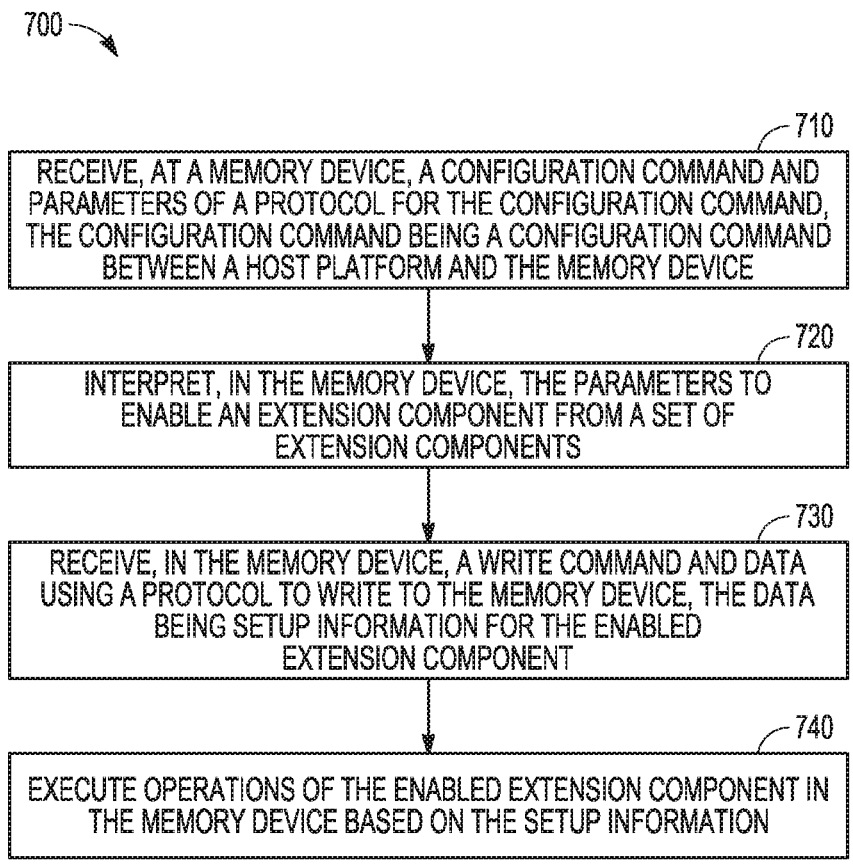
FIG. 7 is a flow diagram of an example method to manage a memory device, according to various embodiments.

FIG. 7 is a flow diagram of an embodiment of an example method to manage a memory device. At 710, a configuration command and parameters of a protocol for the configuration command are received at a memory device, the configuration command being a configuration command between a host platform and the memory device. Receiving the configuration command can include receiving an EMMC or a UFS command. Other standard command formats may be used depending on the application. At 720, the parameters are interpreted, in the memory device, to enable an extension component from a set of extension components. An extension component is firmware in the memory device with instructions to execute operations on components of the memory device. The extension components of the set can be partitioned to conduct different operations. Commands and associated parameters received after enabling the extension component may be directed to the extension component until the extension component is disabled. At 730, a write command and data using a protocol to write to the memory device is received in the memory device, the data being setup information for the enabled extension component. At 740, operations of the enabled extension component are executed in the memory device based on the setup information. The memory device can be a NAND memory device.

Variations of method 700 or methods similar to method 700 can include a number of different embodiments that may be combined depending on the application of such methods and/or the architecture of systems in which such methods are implemented. Such methods can include upon interpreting the parameters to enable the extension component, enabling a switch to monitor commands into the memory device and direct the setup information to the enabled extension component upon receiving the write command. Enabling the switch to direct the setup information to the enabled extension component can include routing the setup information to the enabled extension component in accordance with a protocol of the enabled extension component. The protocol of the enabled extension component can be stored in one or more tables in firmware on the memory device. Routing the setup information to the enabled extension component can include routing the setup information to an interface of the extension component. Variations of method 700 or methods similar to method 600 can include receiving, in the memory device, a read command and parameters of a protocol for the read command, and outputting data from executing the operations of the enabled extension component.

Firmware for a memory device can comprise instructions, such as a microcode, which when executed by a controller, can cause performance of operations comprising: receiving, at the memory device, a configuration command and parameters of a protocol for the configuration command, the configuration command being a configuration command between a host platform and the memory device; interpreting, in the memory device, the parameters to enable an extension component from a set of extension components, an extension component being firmware in the memory device with instructions to execute operations on components of the memory device, the extension components of the set partitioned to conduct different operations; receiving, in the memory device, a write command and data using a protocol to write to the memory device, the data being setup information for the enabled extension component; and executing operations of the enabled extension component in the memory device based on the setup information. The instructions may be structured for the memory device being a NAND memory device.

Variations of instructions of the above firmware or similar firmware can include a number of different embodiments that may be combined depending on the application of such firmware and/or the architecture of systems in which such firmware is implemented. Such instructions of the firmware, which when executed by a controller, can cause performance of operations, which operations can include, upon interpreting the parameters to enable the extension component, enabling a switch to monitor commands into the memory device and direct the setup information to the enabled extension component upon receiving the write command. Enabling the switch to direct the setup information to the enabled extension component can include routing the setup information to the enabled extension component in accordance with a protocol of the enabled extension component. Routing the setup information to the enabled extension component can include routing the setup information to an interface of the extension component.

Instructions of the firmware, which when executed by a controller, can cause performance of operations, where operations can include receiving, in the memory device, a read command and parameters of a protocol for the read command, and outputting data from executing the operations of the enabled extension component. The instructions can include instructions with respect to receiving the configuration command to include receiving an EMMC command. The instructions can include instructions to direct commands and associated parameters received after enabling the extension component to the extension component until the extension component is disabled.

In various embodiments, a memory device can comprise: an array of memory cells, the array addressable in response to the memory device receiving a read or write command having a protocol associated with reading or writing data in the memory array; access circuitry to access the array of memory cells; input/output circuitry coupled to receive a command and parameters of a protocol for the command and configured to hold the parameters; one or more extension components partitioned in firmware, each extension component having stored instructions to execute operations on components of the memory device, each extension components to conduct an operation different from the other components; and a switch of the firmware, the switch enabled by reception, in the input circuitry, of a configuration command and enablement parameters of a protocol for the configuration command, such that the switch is operable to select an extension component for enablement and to route parameters of a received read or write command to the extension component or to route the parameters of the received read or write command to the access circuitry to access the array. The configuration command and enablement parameters can be used to select the extension component of the one or more extension components to load. The configuration command may be an EMMC command with the enablement parameters in one or more fields of a protocol of the EMMC command. The memory array can be a three-dimensional NAND memory array.

Variations of the above memory device or similar memory devices can include a number of different embodiments that may be combined depending on the application of such memory devices and/or the architecture of systems in which such memory devices are implemented. Such memory devices can include the one or more extension components to include an extension component having a feature to debug the memory device. The one or more extension components can include a memory vendor command extension component to manage and execute a set of memory vendor commands in the memory device, where the memory vendor commands are separate from commands generated by a host platform operable with memory device. The switch can be arranged to be operable to transfer, to the memory vendor command extension, a write command having a data block containing parameters for an identified memory vendor command of the set of memory vendor commands. The one or more extension components can include a log system extension component to acquire and output log information directly from the memory device, the log information stored in the memory device. The one or more extension components include a trace system extension component to start, acquire, and read of trace points in operation of the memory device. The one or more extension components can include an internal protocol analyzer extension component to capture and analyze signals and data flow in the memory device and output results of the capture and analysis.

In various embodiments, a system can comprise a host platform and one or more memory devices arranged to receive signals from the host platform. At least one memory device of the one or more memory devices can include: an array of memory cells, the array addressable in response to the memory device receiving a read or write command having a protocol associated with reading or writing data in the memory array; access circuitry to access the array of memory cells; input/output circuitry coupled to receive a command and parameters of a protocol for the command and configured to hold the parameters; one or more extension components partitioned in firmware, each extension component having stored instructions to execute operations on components of the memory device, each extension components to conduct an operation different from the other components; and a switch of the firmware, the switch enabled by reception, in the input circuitry, of a configuration command and enablement parameters of a protocol for the configuration command, such that the switch is operable to select an extension component for enablement and to route parameters of a received read or write command to the extension component or to route the parameters of the received read or write command to the access circuitry to access the array. The one or more extension components can include an extension component having a feature to debug the at least one memory device. The one or more extension components can include one or more extension components from a group of extension components including a memory vendor command extension component, a log system extension component, a trace system extension component, and an internal protocol analyzer extension component. The host platform can include stored instructions to run a dedicated test flow of the at least one memory device and to load parameters of the dedicated test flow into fields of a protocol for a write command and transmit the write command and the parameters to the at least one memory device.

VPM arrangements, as taught herein, can provide enhancements for operation of memory devices that is not provided by other approaches. Such VPM arrangements can provide full access to all memory device capabilities using the standard host protocol transaction. The VPM arrangements do not require any changes on the host platform such as a dedicated device driver, modified OS, or super user permission. Application of VPM and extension components allows implementation of any type of application on the memory device. VPM arrangements, as taught herein, can provide a modular schema for adding any new memory device capability or feature. Such VPM arrangements can accelerate debug and failure analysis without requiring particular host platform software and/or hardware configurations. To perform debug and failure analysis, the memory device need not be removed or desoldered from the host platform. Failure analysis can be performed directly on the host platform.

The above detailed description includes references to the accompanying drawings, which form a part of the detailed description. The drawings show, by way of illustration, specific embodiments in which the invention can be practiced. These embodiments are also referred to herein as "examples". Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" may include "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

In various examples, the components, controllers, processors, units, engines, or tables described herein can include, among other things, physical circuitry or firmware stored on a physical device. As used herein, "processor" means any type of computational circuit such as, but not limited to, a microprocessor, a microcontroller, a graphics processor, a digital signal processor (DSP), or any other type of processor or processing circuit, including a group of processors or multi-core devices.

Operating a memory cell, as used herein, includes reading from, writing to, or erasing the memory cell. The operation of placing a memory cell in an intended state is referred to herein as "programming," and can include both writing to or erasing from the memory cell (e.g., the memory cell may be programmed to an erased state).

According to one or more embodiments, a memory controller (e.g., a processor, controller, firmware, etc.) located internal or external to a memory device, is capable of determining (e.g., selecting, setting, adjusting, computing, changing, clearing, communicating, adapting, deriving, defining, utilizing, modifying, applying, etc.) a quantity of wear cycles, or a wear state (e.g., recording wear cycles, counting operations of the memory device as they occur, tracking the operations of the memory device it initiates, evaluating the memory device characteristics corresponding to a wear state, etc.)

According to one or more embodiments, a memory access device may be configured to provide wear cycle information to the memory device with each memory operation. The memory device control circuitry (e.g., control logic) may be programmed to compensate for memory device performance changes corresponding to the wear cycle information. The memory device may receive the wear cycle information and determine one or more operating parameters (e.g., a value, characteristic) in response to the wear cycle information.

It will be understood that when an element is referred to as being "on," "connected to" or "coupled with" another element, it can be directly on, connected, or coupled with the other element or intervening elements may be present. In contrast, when an element is referred to as being "directly on," "directly connected to" or "directly coupled with" another element, there are no intervening elements or layers present. If two elements are shown in the drawings with a line connecting them, the two elements can be either be coupled, or directly coupled, unless otherwise indicated.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact discs and digital video disks), magnetic cassettes, memory cards or sticks, random access memories (RAMs), read only memories (ROMs), solid state drives (SSDs), Universal Flash Storage (UFS) device, embedded MMC (eMMC) device, and the like.

The above description is intended to be illustrative, and not restrictive. For example, the above-described examples (or one or more aspects thereof) may be used in combination with each other. Other embodiments can be used, such as by one of ordinary skill in the art upon studying the above description. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations.

What is claimed is:

1. A method comprising:
   receiving, at a memory device, a configuration command and parameters of a protocol for the configuration command, the configuration command being a configuration command between a host platform and the memory device;
   interpreting, in the memory device, the parameters to enable an extension component from a set of extension components, an extension component being firmware in the memory device with instructions to execute operations on components of the memory device, the extension components of the set partitioned to conduct different operations;
   receiving, in the memory device, a write command and data using a protocol to write to the memory device, the data being setup information for the enabled extension component; and
   executing operations of the enabled extension component in the memory device based on the setup information.

2. The method of claim 1, wherein, upon interpreting the parameters to enable the extension component, enabling a switch to monitor commands into the memory device and direct the setup information to the enabled extension component upon receiving the write command.

3. The method of claim 2, wherein the method includes receiving, in the memory device, a read command and parameters of a protocol for the read command, and outputting data from executing the operations of the enabled extension component.

4. The method of claim 2, wherein enabling the switch to direct the setup information to the enabled extension component includes routing the setup information to the enabled extension component in accordance with a protocol of the enabled extension component.

5. The method of claim 4, wherein routing the setup information to the enabled extension component includes routing the setup information to an interface of the extension component.

6. The method of claim 1, wherein receiving the configuration command includes receiving an embedded multi-media controller (EMMC) or a universal flash storage (UFS) command.

7. The method of claim 1, wherein commands and associated parameters received after enabling the extension component are directed to the extension component until the extension component is disabled.

8. The method of claim 1, wherein the memory device is a NAND memory device.

9. A memory device comprising:
a controller including processing circuitry having one or more processors, the controller configured to cause the memory device to perform operations, the operations comprising:
receiving a configuration command and parameters of a protocol for the configuration command, the configuration command being a configuration command between a host platform and the memory device;
interpreting the parameters to enable an extension component from a set of extension components, an extension component being firmware in the memory device with instructions to execute operations on components of the memory device, the extension components of the set partitioned to conduct different operations;
receiving a write command and data using a protocol to write to the memory device, the data being setup information for the enabled extension component; and
executing operations of the enabled extension component in the memory device based on the setup information.

10. The memory device of claim 9, wherein, upon interpreting the parameters to enable the extension component, the operations include enabling a switch in the memory device to monitor commands into the memory device and direct the setup information to the enabled extension component upon receiving the write command.

11. The memory device of claim 10, wherein the operations include receiving, in the memory device, a read command and parameters of a protocol for the read command, and outputting data from executing the operations of the enabled extension component.

12. The memory device of claim 10, wherein enabling the switch to direct the setup information to the enabled extension component includes routing the setup information to the enabled extension component in accordance with a protocol of the enabled extension component.

13. The memory device of claim 12, wherein routing the setup information to the enabled extension component includes routing the setup information to an interface of the extension component.

14. The memory device of claim 9, wherein receiving the configuration command includes receiving an embedded multi-media controller (EMMC) or a universal flash storage (UFS) command.

15. The memory device of claim 9, wherein commands and associated parameters received after enabling the extension component are directed to the extension component until the extension component is disabled.

16. The memory device of claim 9, wherein the memory device is a NAND memory device having a three-dimensional memory array.

17. A memory device comprising:
an array of memory cells, the array addressable in response to the memory device receiving a read or write command having a protocol associated with reading or writing data in the memory array;
access circuitry to access the array of memory cells;
input/output circuitry coupled to receive a command and parameters of a protocol for the command and configured to hold the parameters;
a controller including processing circuitry having one or more processors, the controller configured to cause the memory device to perform operations, the operations comprising:
receiving, using the input/output circuitry, a configuration command and parameters of a protocol for the configuration command, the configuration command being a configuration command between a host platform and the memory device;
interpreting the parameters to enable an extension component from a set of extension components, an extension component being firmware in the memory device with instructions to execute operations on components of the memory device, the extension components of the set partitioned to conduct different operations;
receiving a write command and data using a protocol to write to the memory device, the data being setup information for the enabled extension component; and
executing operations of the enabled extension component in the memory device based on the setup information.

18. The memory device of claim 17, wherein the set of extension components includes an extension component having a feature to debug the memory device.

19. The memory device of claim 17, wherein the set of extension components includes a memory vendor command extension component, a log system extension component, a trace system extension component, and an internal protocol analyzer extension component.

20. A memory device of claim 17, wherein upon interpreting the parameters to enable the extension component, the operations include enabling a switch of the memory device to monitor commands into the memory device and direct the setup information to the enabled extension component upon receiving the write command.

* * * * *